(12) United States Patent
Zhang

(10) Patent No.: US 10,644,900 B2
(45) Date of Patent: May 5, 2020

(54) FORWARDING MULTICAST DATA PACKETS USING BIT INDEX EXPLICIT REPLICATION (BIER) FOR BIER-INCAPABLE NETWORK DEVICES

(71) Applicant: Juniper Networks, Inc., Sunnyvale, CA (US)

(72) Inventor: Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/012,595

(22) Filed: Jun. 19, 2018

(65) Prior Publication Data

US 2019/0386850 A1  Dec. 19, 2019

(51) Int. Cl.
| | |
|---|---|
| *H04L 12/28* | (2006.01) |
| *H04L 12/46* | (2006.01) |
| *H04L 12/18* | (2006.01) |
| *H04L 12/927* | (2013.01) |
| *H04L 12/911* | (2013.01) |
| *H04L 12/66* | (2006.01) |

(52) U.S. Cl.
CPC .......... *H04L 12/4633* (2013.01); *H04L 12/18* (2013.01); *H04L 47/806* (2013.01); *H04L 47/825* (2013.01); *H04L 12/66* (2013.01)

(58) Field of Classification Search
CPC . H04L 12/18; H04L 12/1836; H04L 12/1877; H04L 12/1881
USPC ........................................ 370/390, 432, 437
See application file for complete search history.

(56) References Cited

U.S. PATENT DOCUMENTS

| | | | | |
|---|---|---|---|---|
| 9,438,432 | B2 * | 9/2016 | Shepherd | ................ H04L 45/74 |
| 9,544,230 | B2 * | 1/2017 | Wijnands | ................ H04L 45/28 |
| 9,906,378 | B2 * | 2/2018 | Lindem, III | ........ H04L 12/4633 |
| 9,948,574 | B2 * | 4/2018 | Shepherd | ................ H04L 45/74 |
| 10,164,794 | B2 * | 12/2018 | Wijnands | ............ H04L 12/4625 |
| 10,225,090 | B2 * | 3/2019 | Wijnands | ............ H04L 12/1886 |
| 2015/0078378 | A1 | 3/2015 | Wijnands et al. | |
| 2015/0131658 | A1 * | 5/2015 | Wijnands | ................ H04L 45/16 |
| | | | | 370/390 |
| 2017/0317841 | A1 * | 11/2017 | Xu | ........................ H04L 12/18 |

(Continued)

FOREIGN PATENT DOCUMENTS

WO  2017141076 A1  8/2017

OTHER PUBLICATIONS

Wijnands, Encapsulation for BIER in MPLS Networks, IETF, Jun. 2015, pp. 1-15.*

(Continued)

*Primary Examiner* — Dmitry Levitan
(74) *Attorney, Agent, or Firm* — Harrity & Harrity, LLP

(57) ABSTRACT

A network device may transmit, to a first neighbor network device, information indicating that the network device supports bit indexed explicit replication (BIER), where the network device does not support BIER. The network device may receive, from the first neighbor network device, a multicast packet that includes a first BIER label associated with the network device. The network device may replace the first BIER label with a second BIER label associated with a second neighbor network device, and may transmit the multicast packet to the second neighbor network device. The second neighbor network device may be to tunnel the multicast packet to a third neighbor network device that supports BIER.

20 Claims, 13 Drawing Sheets

(56) References Cited

U.S. PATENT DOCUMENTS

| | | | |
|---|---|---|---|
| 2018/0205636 A1* | 7/2018 | Hu | H04L 45/16 |
| 2018/0278522 A1* | 9/2018 | Asati | H04L 67/2842 |
| 2018/0367456 A1* | 12/2018 | Wijnands | H04L 45/745 |
| 2019/0068524 A1 | 2/2019 | Shepherd et al. | |
| 2019/0075041 A1* | 3/2019 | Wang | H04L 41/0806 |
| 2019/0097944 A1* | 3/2019 | Kotalwar | H04L 12/185 |

OTHER PUBLICATIONS

Przygienda, BEIR support via ISIS, IETF, Jan. 2015, pp. 1-13.*
Psenak, OSPF Extension for BIER, IETF, Feb. 2015, pp. 1-8.*
Wijnands, Multicast using BIER, IETF, Mar. 2015, pp. 1-30.*
Extended European Search Report for Application No. EP19166354.1, dated Sep. 26, 2019, 11 pages.
Vasseur J.P., et al., "IGP Routing Protocol Extensions for Discovery of Traffic Engineering Node Capabilities; rfc5073.txt", Internet Engineering Task Force (IETF) Standard, Internet Society, (ISOC) 4, Switzerland, Dec. 1, 2007, XP015055145.
Xie J., et al., "Multicast VPN Using MPLS P2MP and BIER, draft-xie-bier-mvpn-mpls-p2mp-01", Mar. 5, 2018, Switzerland, pp. 1-24, XP05562002, [Retrieved on Sep. 9, 2019] Retrieved from the Internet: [URL: https://tools.ietf.org/pdf/draft-xie-bier-mvpn-mpls-p2mp-01.pdf].
Extended European Seach Report for Application No. EP19200016.4, dated Feb. 4, 2020, 11 pages.
Zhang Z., et al., "BIER Prefix Redistribute; draft-zwzw-bier-prefix-redistribute-01.txt," Internet Engineering Task Force (IETF), Internet Society (ISOC), No. 1, Sep. 13, 2018, pp. 1-8, XP015128542, [retrieved on Sep. 13, 2018].

* cited by examiner

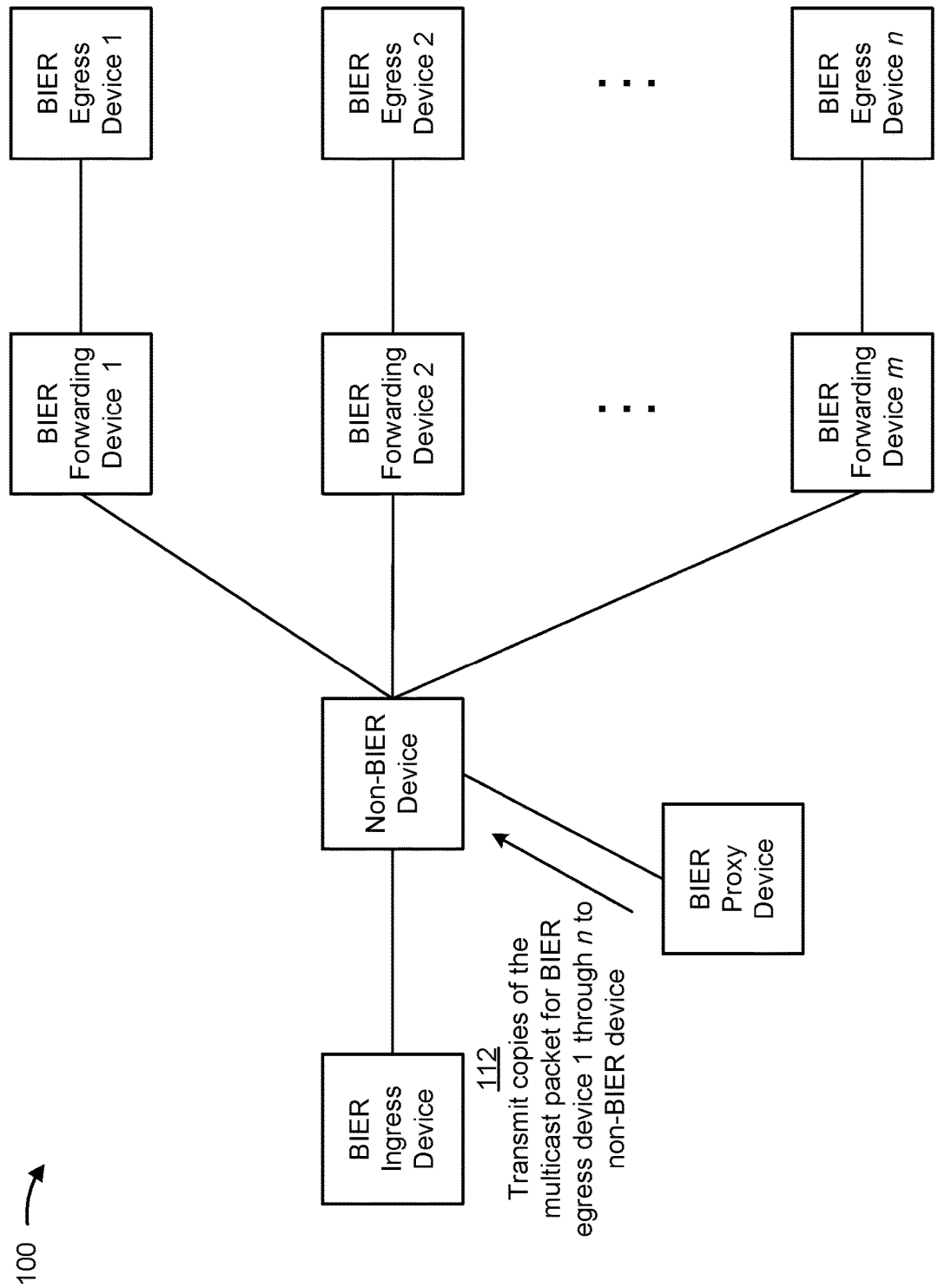

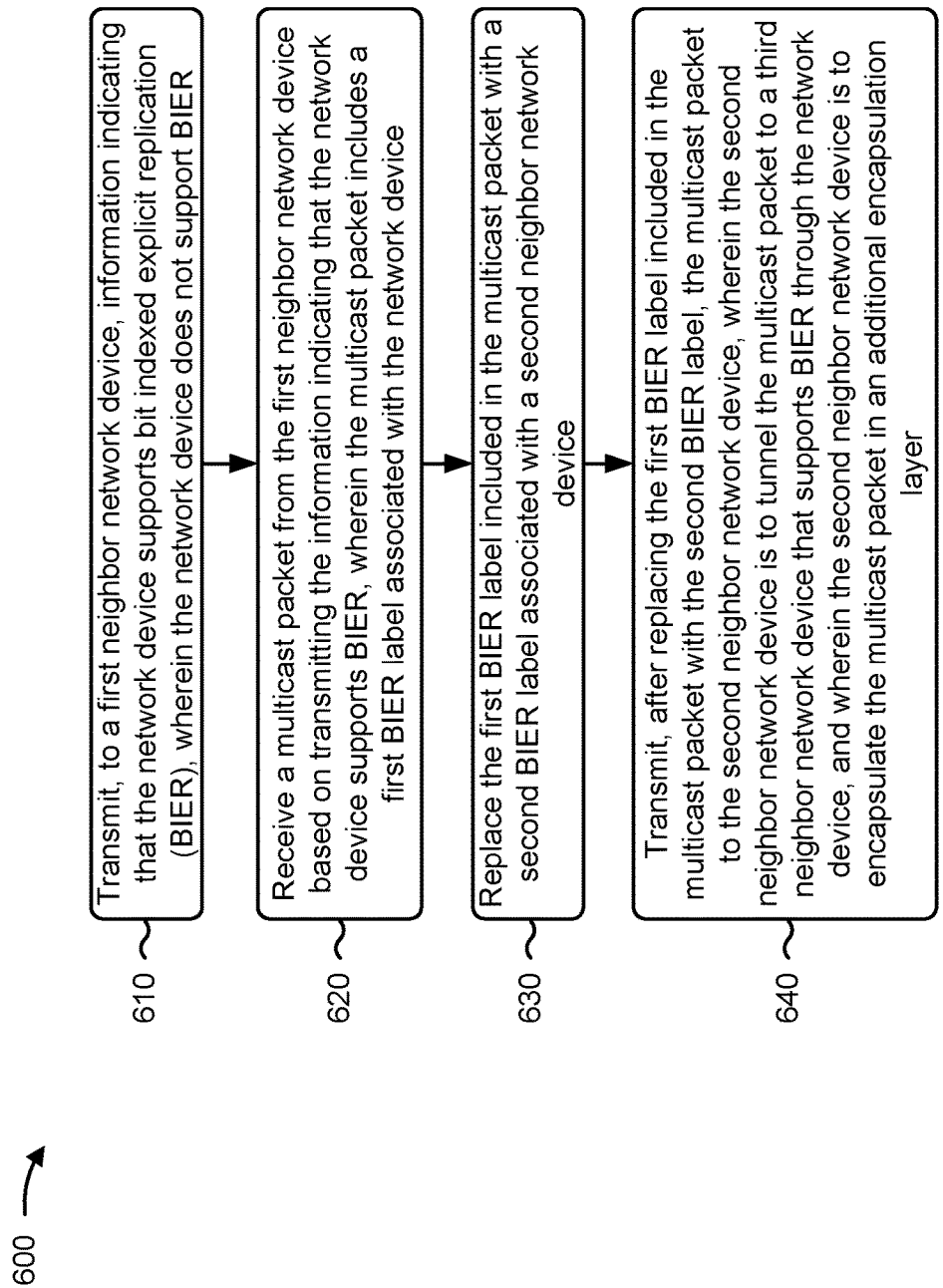

FORWARDING MULTICAST DATA PACKETS USING BIT INDEX EXPLICIT REPLICATION (BIER) FOR BIER-INCAPABLE NETWORK DEVICES

BACKGROUND

Bit index explicit replication (BIER) is a communication protocol for forwarding multicast data packets between network devices. The network devices may use BIER to forward multicast data packets without having to build multicast distribution trees, maintain per-flow forwarding states, and/or the like.

SUMMARY

According to some implementations, a network device may include one or more memories, and one or more processors to transmit, to a first neighbor network device, information indicating that the network device supports BIER, wherein the network device does not support BIER. The one or more processors may receive a multicast packet from the first neighbor network device based on transmitting the information indicating that the network device supports BIER, wherein the multicast packet includes a first BIER label associated with the network device. The one or more processors may replace the first BIER label included in the multicast packet with a second BIER label associated with a second neighbor network device, and may transmit, based on replacing the first BIER label included in the multicast packet with the second BIER label, the multicast packet to the second neighbor network device. The second neighbor network device may be to tunnel the multicast packet to a third neighbor network device that supports BIER.

According to some implementations, a non-transitory computer-readable medium may store instructions that include one or more instructions that, when executed by one or more processors of a network device, cause the one or more processors to transmit, to a first neighbor network device, information indicating that the network device supports BIER, wherein the network device does not support BIER. The one or more instructions may cause the one or more processors to receive a multicast packet from the first neighbor network device based on transmitting the information indicating that the network device supports BIER, wherein the multicast packet includes a first BIER label associated with the network device. The one or more instructions may cause the one or more processors to replace the first BIER label included in the multicast packet with a second BIER label associated with a second neighbor network device, and to transmit, after replacing the first BIER label included in the multicast packet with the second BIER label, the multicast packet to the second neighbor network device. The second neighbor network device may be to tunnel the multicast packet to a third neighbor network device that supports BIER and may encapsulate the multicast packet in an additional encapsulation layer.

According to some implementations, a method may include transmitting, by a network device and to a first neighbor network device, information indicating that the network device supports BIER, wherein the network device does not support BIER. The method may include receiving, at the network device, a multicast packet from the first neighbor network device based on transmitting the information indicating that the network device supports BIER, wherein the multicast packet includes a first BIER label associated with the network device. The method may include replacing, by the network device, the first BIER label included in the multicast packet with a second BIER label associated with a second neighbor network device, and transmitting, by the network device and after replacing the first BIER label included in the multicast packet with the second BIER label, the multicast packet to the second neighbor network device. The second neighbor network device may be to generate a plurality of copies of the multicast packet and tunnel the plurality of copies of the multicast packet to a plurality of third neighbor network devices. The second neighbor network device may be to tunnel the multicast packet to a third neighbor network device that supports BIER through the network device, and may encapsulate the multicast packet in an additional encapsulation layer.

BRIEF DESCRIPTION OF THE DRAWINGS

FIG. 1A-1H are diagrams of an example implementation described herein.

FIG. 6 is a flow chart of an example process for forwarding multicast data packets using BIER for BIER-incapable network devices.

DETAILED DESCRIPTION

Figure 1A:
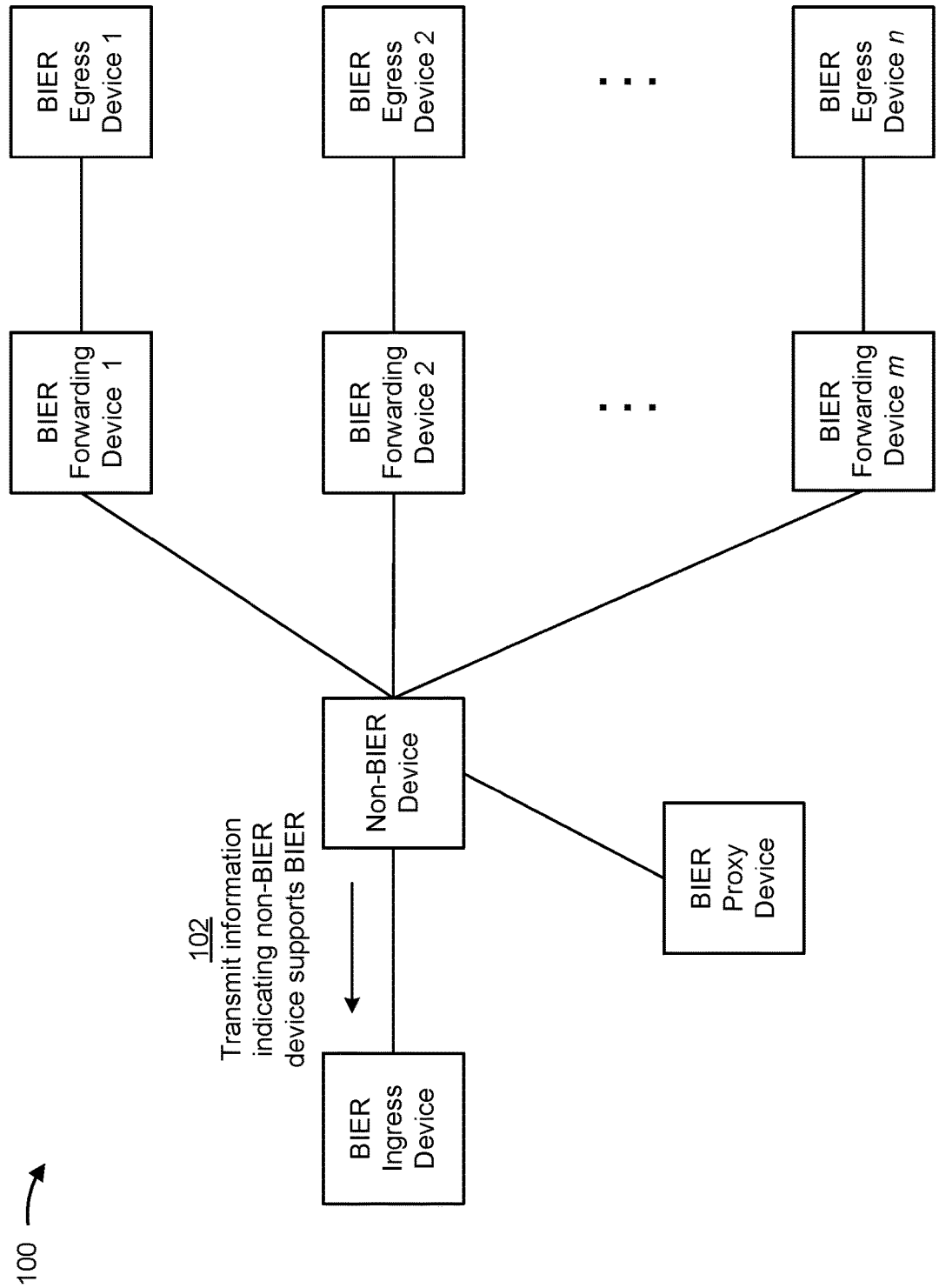

The following detailed description of example implementations refers to the accompanying drawings. The same reference numbers in different drawings may identify the same or similar elements.

A network device, such as a BIER-enabled device, may receive a multicast packet and forward the multicast packet to a neighbor network device by encapsulating the multicast packet in a BIER header. The BIER header may include a bit string that identifies one or more destination network devices that are the intended recipients of the multicast packet. Each position in the bit string may correspond to a destination network device of the one or more destination network devices. For example, a bit string of 0011 may identify a first destination network device associated with BIER identifier 0001 and a second destination network device associated with BIER identifier 0010.

If the neighbor network device also supports BIER, the neighbor network device may receive the multicast packet with the BIER header and may determine where to transmit a copy of the multicast packet based on the bit string in the BIER header. To forward a copy of the multicast packet, the neighbor network device may identify the bit string in the BIER header, may identify a least significant bit (e.g., the rightmost bit) in the bit string that is set to a 1 value (e.g., 0001 in the bit string example above), and may perform a lookup in a bit index forwarding table (BIFT) associated with the neighbor network device based on the least significant bit.

When performing the lookup, the neighbor network device may identify, in the BIFT, a BIER identifier associated with the least significant bit (e.g., the BIER identifier 0001 associated with the first destination network device) and may identify a forwarding bit mask and a bit forwarding neighbor device associated with the BIER identifier. The forwarding bit mask may identify one or more destination network devices that are reachable via the bit forwarding neighbor device associated with the forwarding bit mask. For example, a forwarding bit mask of 0001 may identify the first destination network device as being reachable via the bit forwarding neighbor device, a forwarding bit mask of 0011 may identify the first destination network device and the second destination network device as being reachable via the bit forwarding neighbor device, and so on.

The neighbor network device may generate a copy of the multicast packet, encapsulate the copy of the multicast packet in a BIER header, add a BIER label identifying the bit forwarding neighbor device in front of the BIER header, and may transmit the copy of the multicast packet to the bit forwarding neighbor device. The BIER header of the copy of the multicast packet may include a bit string corresponding to the forwarding bit mask associated with the bit forwarding neighbor device. In some cases, the forwarding neighbor may be a neighbor of a plurality of intended recipients of the multicast packet, and thus the bit string of the copy of the multicast packet may represent the BIER identifiers associated with the plurality of intended recipients. In some cases, the bit forwarding neighbor device may receive the copy of the multicast packet and may perform actions similar to those performed by the neighbor network device, and the process may continue until all intended recipients of the multicast packet receive a copy of the multicast packet. In some cases, the bit forwarding neighbor device may be a destination of the multicast packet (e.g., the first destination network device), and thus the bit string may also represent the BIER identifier associated with the first destination network device.

In some cases, a network device may be a BIER-incapable device (referred to herein as a non-BIER device) if the network device does not support BIER. A non-BIER device may not be retrofittable to support BIER due to BIER functionality (e.g., the functionality to encapsulate a multicast packet in a BIER header, the functionality to recognize and understand a BIER header, the functionality to forward a multicast packet based on a BIER header, etc.) being implemented in forwarding plane hardware of a BIER-enabled device. Thus, a non-BIER device would have to be retrofitted with new forwarding plane hardware in order to support BIER, which may be impractical in a network of hundreds or thousands of non-BIER devices. This can make BIER difficult to implement in a brownfield deployment (i.e., an upgrade to an existing network), where BIER-enabled devices may coexist with non-BIER devices.

One technique to deploy BIER in a network including a non-BIER device is to tunnel BIER-encapsulated multicast packets through the non-BIER device using unicast tunnels. To tunnel a BIER-encapsulated multicast packet between a first BIER-enabled device and a second BIER-enabled device through a non-BIER device, the first BIER-enabled device may add an additional encapsulation layer onto the BIER-encapsulated multicast packet. In this way, the BIER-encapsulated multicast packet becomes the payload of the additional encapsulation layer. The additional encapsulation layer may be a header recognizable by the non-BIER device, such as an Ethernet header, a multiprotocol label switching (MPLS) header, a user datagram protocol (UDP) header, and/or the like. The first non-BIER device may then transmit the BIER-encapsulated multicast packet with the additional encapsulation layer to the non-BIER device via a unicast tunnel, such as a MPLS tunnel, an Ethernet tunnel, a UDP tunnel, and/or the like. The non-BIER device may receive the BIER-encapsulated multicast packet with the additional encapsulation layer and may forward the BIER-encapsulated multicast packet with the additional encapsulation layer to the second BIER-enabled device using a second unicast tunnel.

While the above technique allows for the use of BIER in the presence of the non-BIER network device, the above technique does not scale well as the quantity of network devices to which the non-BIER device is communicatively connected becomes large. Since the non-BIER device cannot replicate a BIER-encapsulated multicast packet received from the BIER-enabled device via the unicast tunnel, the BIER-enabled device may perform the replication for the non-BIER network device. As a result, the BIER-enabled device needs to replicate, encapsulate, and tunnel a large quantity of BIER-encapsulated packets to the non-BIER device, which increases the consumption of bandwidth resources between the BIER-enabled device and the non-BIER device. This can cause increased latency and/or dropped packets on the connection between the BIER-enabled network device and the non-BIER network device if the connection is a low-bandwidth connection and/or a long-distance connection.

Some implementations described herein provide a non-BIER device that is capable of receiving BIER-encapsulated multicast packets from a BIER-enabled device in a network without the use of additional encapsulation for tunneling between the BIER-enabled device and the non-BIER device. The non-BIER device may transmit information to the BIER-enabled device that indicates the non-BIER device supports BIER. In this way, the BIER-enabled device determines that the non-BIER device supports BIER when the non-BIER device actually does not. As a result, the BIER-enabled device may transmit a first BIER-encapsulated multicast packet to the non-BIER device without additional encapsulation for unicast tunneling the first BIER-encapsulated multicast packet to the non-BIER device. In this way, bandwidth resource usage on the connection between the BIER-enabled device and the non-BIER device is reduced, which improves latency on the connection and allows the connection to be long-distance and/or low-bandwidth.

In some implementations described herein, the non-BIER device may receive the first BIER-encapsulated multicast packet and may transmit the first BIER-encapsulated multicast packet to a BIER proxy device. The BIER proxy device may be configured to know that the non-BIER device does not support BIER (e.g., based on information provided by the non-BIER device, based on static programming of the BIER proxy device, etc.). Thus, the BIER proxy device may receive the first BIER-encapsulated multicast packet from the non-BIER device and may perform replication of the first BIER-encapsulated multicast packet for the non-BIER device. The replication may include generating a plurality of second BIER-encapsulated multicast packets based on the received BIER-encapsulated multicast packet. The second BIER-encapsulated multicast packets may include an additional layer of encapsulation for unicast tunneling between the BIER proxy device and the non-BIER device, as well as between the non-BIER device and any additional network devices neighboring the non-BIER device.

The BIER proxy device may transmit the plurality of second BIER-encapsulated multicast packets with the additional layer of encapsulation to the non-BIER device. The connection between the BIER proxy device and the non- BIER device may be a high-bandwidth and/or short-distance (e.g., the devices may be co-located in the same room, in the same equipment rack, etc.). In this way, the connection is capable of accommodating the additional bandwidth usage of transmitting the plurality of second BIER-encapsulated multicast packets with the additional layer of encapsulation, which improves throughput in the network and reduces latency in the network.

FIGS. 1A-1H are diagrams of an example implementation 100 described herein. As shown in FIGS. 1A-1H, example implementation 100 may include a plurality of network devices, such as a BIER ingress device, a plurality of BIER egress devices 1 through n (collectively referred to as "BIER egress devices", and individually as "BIER egress device"), a plurality of BIER forwarding devices 1 though m (collectively referred to as "BIER forwarding devices", and individually as "BIER forwarding device"), a non-BIER device, a BIER proxy device, and/or the like. While FIGS. 1A-1H show a single BIER egress device communicatively connected with a single BIER forwarding device, in some implementations, a BIER egress device may be communicatively connected with a plurality of BIER forwarding device and/or a BIER forwarding device may be communicatively connected with a plurality of BIER egress devices. In some implementations, the non-BIER device may be communicatively connected with a plurality of BIER ingress devices and/or a plurality of BIER proxy devices. In some implementations, the BIER proxy device may be communicatively connected with a plurality of non-BIER devices, and/or the BIER ingress device may be communicatively connected with a plurality of non-BIER devices. In some implementations, the non-BIER device may be directly communicatively connected with one or more BIER egress devices.

As shown in FIGS. 1A-1H, the BIER ingress device and the non-BIER device may be neighbors, the BIER proxy device and the non-BIER device may be neighbors, the non-BIER device may be neighbors with the BIER forwarding devices, and each BIER forwarding device may be neighbors with respective BIER egress device (e.g., BIER forwarding device 1 may be neighbors with BIER egress device 1, BIER forwarding device 2 may be neighbors with BIER egress device 2, and so on).

In some implementations, the BIER ingress device, the BIER egress devices, the BIER forwarding devices, the non-BIER device, and the BIER proxy device may be included in a BIER domain. The BIER domain may be a portion of a network in which BIER is used to forward or transmit multicast packets. In some implementations, the BIER ingress device, the BIER egress devices, the BIER forwarding devices, the non-BIER device, and/or the BIER proxy device may be included in a plurality of BIER domains and may perform different functions in the plurality of BIER domains. For example, the BIER ingress device and BIER egress device 1 may be included in a first BIER domain, and BIER egress device 1 may be included in a second BIER domain, in which BIER egress device 1 is a BIER ingress device.

The BIER ingress device may be a BIER-enabled network device that functions as an entry point for multicast packets into a BIER domain. The BIER ingress device may receive a multicast packet (e.g., from another network, from another BIER egress device in another BIER domain, and/or the like) and may determine one or more BIER egress devices in the BIER domain that are to receive a copy of the multicast packet. The BIER ingress device may encapsulate the multicast packet, based on determining the one or more BIER egress devices, by adding a BIER header to the multicast packet and adding a BIER label, to the multicast packet, identifying a next hop in a path to the one or more BIER egress devices. The BIER ingress device may transmit the BIER-encapsulated multicast packet to the next hop in the BIER domain. The BIER header of the multicast packet may include a bit string that includes information identifying the one or more BIER egress devices. For example, the bit string may be four bits in length (or any other length), and may be 0111, where the right-most 1 value (i.e., 0001) identifies BIER egress device 1, the second 1 value from the right (i.e., 0010) identifies BIER egress device 2, and the third 1 value from the right (i.e., 0100) identifies BIER egress device n.

A BIER egress device may be a BIER-enabled network device that functions as an exit point for multicast packets in the BIER domain. The BIER egress device may receive a BIER-encapsulated multicast packet, may remove (or pop off) the BIER header from the BIER-encapsulated multicast packet, and may transmit the payload of the BIER-encapsulated multicast packet (which may be a MPLS packet, an Ethernet packet, etc.) to one or more other network devices in another network, to one or more other network devices in another BIER domain, and/or the like.

A BIER forwarding device may be a BIER-enabled network device that transmits BIER-encapsulated multicast packets to one or more other network devices within the BIER domain. For example, BIER forwarding device 1 may receive a BIER-encapsulated multicast packet, may switch a BIER label, associated with BIER forwarding device 1, of the BIER-encapsulated multicast packet with a BIER label associated with BIER egress device 1, may update a bit string in a BIER header of the BIER-encapsulated multicast packet to represent the BIER identifier associated with BIER egress device 1, and may transmit the BIER-encapsulated multicast packet to BIER egress device 1.

The non-BIER device may be a network device that does not support BIER. One or more BIER-enabled network devices in the BIER domain may transmit BIER-encapsulated packets to the non-BIER device, and/or the non-BIER device may transmit BIER-encapsulated packets to the one or more BIER-enabled network devices, via a unicast tunnel, as described above. For example, the BIER ingress device may add another layer of encapsulation (e.g., a MPLS encapsulation, an Ethernet encapsulation, a UDP encapsulation, etc.) to a BIER-encapsulated multicast packet, and may transmit a BIER-encapsulated multicast packet with the additional layer of encapsulation to the non-BIER device via a unicast tunnel.

The BIER proxy device may be a BIER-enabled network device that performs BIER functions for the non-BIER device. Instead of the BIER ingress device adding an additional layer of encapsulation to a BIER-encapsulated packet and transmitting the BIER-encapsulated packet with the additional layer of encapsulation to the non-BIER device via a unicast tunnel, the BIER ingress device may transmit the BIER-encapsulated packet without the additional layer of encapsulation to the non-BIER device, and the non-BIER device may redirect the BIER-encapsulated packet to the BIER proxy device, which may tunnel the BIER-encapsulated packet through the non-BIER device. The non-BIER device and the BIER proxy device may be communicatively connected via a high-bandwidth and/or short-distance connection. In this way, if the connection between the BIER ingress device and the non-BIER device is a low-bandwidth and/or long-distance connection, BIER-encapsulated multicast packets may be tunneled between the BIER proxy device and the non-BIER device instead of between the BIER ingress device and the non-BIER device so that the tunneling does not cause an increase in latency and/or dropped BIER-encapsulated multicast packets in the BIER domain.

Turning now to FIG. 1A, and as shown by reference number 102, to allow the BIER proxy device to perform BIER functions for the non-BIER device, the non-BIER device may transmit, to the BIER ingress device, information indicating that the non-BIER device supports BIER. In this way, the BIER ingress device determines that the non-BIER device supports BIER when the non-BIER device actually does not support BIER.

In some implementations, the information indicating that the non-BIER device supports BIER may include information identifying a BIER label associated with the non-BIER device. The non-BIER device may generate and transmit the BIER label to the BIER ingress device via interior gateway protocol (IGP) control plane signaling (e.g., intermediate system to intermediate system (IS-IS), open shortest path first (OSPF), etc.), which can be performed without changing forwarding plane hardware of the non-BIER device. In this way, the BIER ingress device may receive the BIER label associated with the non-BIER device, and may determine, based on receiving the BIER label associated with the non-BIER device, that the non-BIER device supports BIER.

Figure 1B:
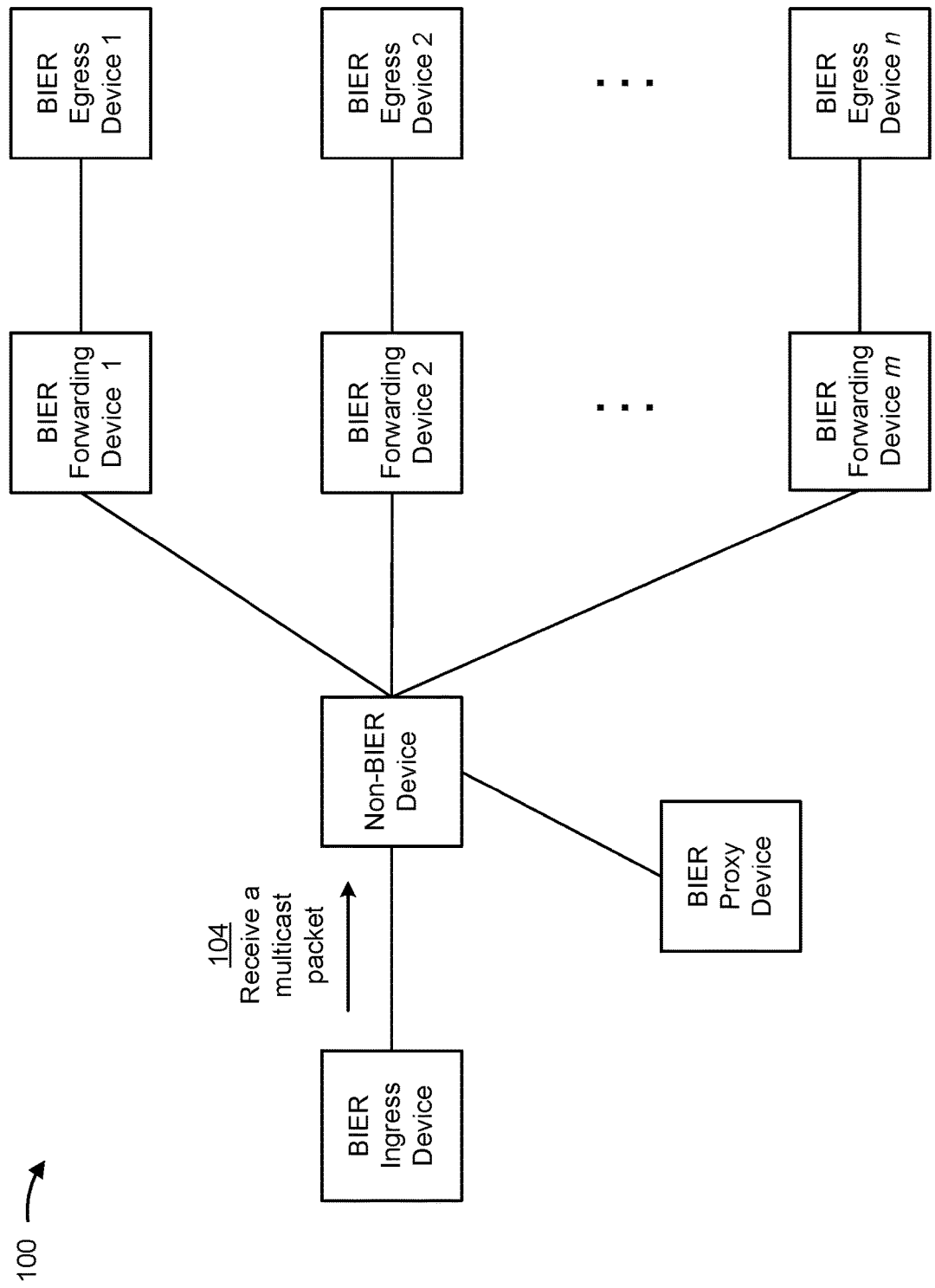

Turning now to FIG. 1B, and as shown by reference number 104, the BIER ingress device may transmit a BIER-encapsulated multicast packet to the non-BIER device based on receiving the information indicating that the non-BIER device supports BIER, and the non-BIER device may receive the BIER-encapsulated multicast packet from the BIER ingress device.

In some implementations, the BIER ingress device may receive a multicast packet (e.g., from a network device in another network, from another BIER egress device in another BIER domain, etc.), and may generate the BIER-encapsulated multicast packet by encapsulating the multicast packet in a BIER header. The BIER header may include a bit string that identifies one or more intended recipients of the multicast packet. For example, the bit string may include information identifying one or more of the BIER egress devices that are a destination for the multicast packet. In the example shown in FIGS. 1A-1H, BIER egress device 1, BIER egress device 2, and BIER egress device n may each be a destination for the multicast packet.

The BIER ingress device may generate the bit string based on information included in a BIFT associated with the BIER ingress device. For example, the BIER ingress device may perform a lookup in the BIFT to identify one or more forwarding bit masks and one or more bit forwarding neighbor devices associated with a BIER identifier associated with BIER egress device 1, associated with a BIER identifier associated with BIER egress device 2, associated with a BIER identifier associated with BIER egress device n, and/or the like. In the example shown in FIGS. 1A-1H, BIER egress device 1, BIER egress device 2, and BIER egress device n, are all reachable via the non-BIER device. Accordingly, the BIER ingress device may determine that the non-BIER device is the bit forwarding neighbor for BIER egress device 1, BIER egress device 2, and BIER egress device n. Thus, the BIER ingress may generate the bit string for the BIER header of the BIER-encapsulated packet so that the bit string includes information identifying the forwarding bit mask associated with the non-BIER device.

As an example of the above, BIER egress device 1 may be assigned a BIER identifier of 0001, BIER egress device 2 may be assigned a BIER identifier of 0010, and BIER egress device n may be assigned a BIER identifier of 0100. Accordingly, the forwarding bit mask associated with the non-BIER device may be 0111, where each bit position in the bit mask corresponds to a BIER identifier of one of BIER egress device 1, BIER egress device 2, or BIER egress device n. As a result, the bit string included in the BIER header of the BIER-encapsulated multicast packet is 0111.

The BIER ingress device may add a BIER label to the BIER-encapsulated multicast packet. The BIER label may be, for example, a BIER label associated with a next hop in a path to the one or more BIER egress devices that are a destination for the multicast packet. In the example shown in FIGS. 1A-1H, the next hop in the path to BIER egress devices 1 through n may be the non-BIER device. Accordingly, the BIER ingress device may add the BIER label, associated with the non-BIER device, to the BIER-encapsulated multicast packet.

Figure 1C:
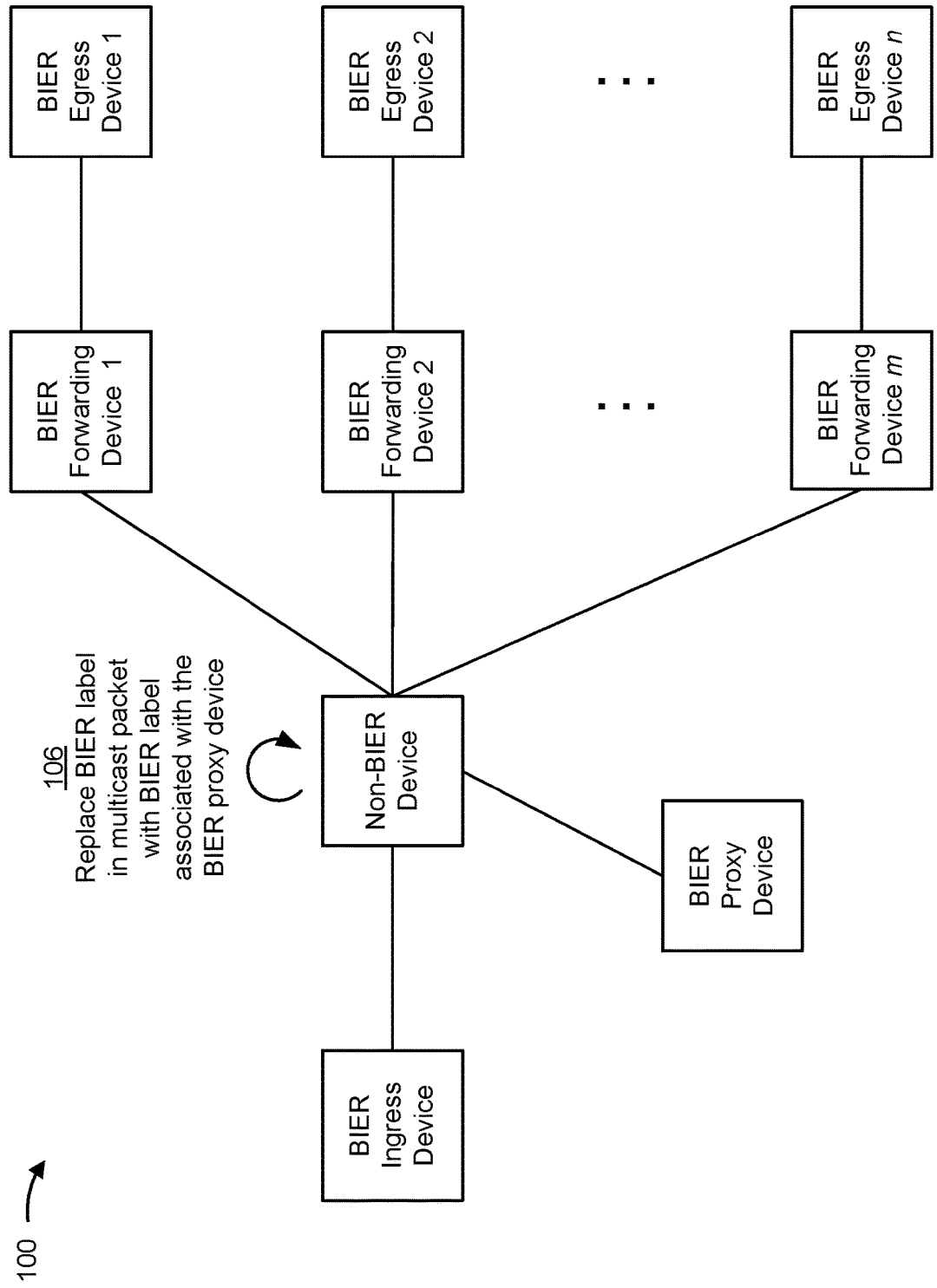

Turning now to FIG. 1C, the non-BIER device may identify, based on receiving the BIER-encapsulated multicast packet, the BIER label in the BIER-encapsulated multicast packet. The non-BIER device may determine that the BIER label in the BIER-encapsulated multicast packet is the BIER label associated with the non-BIER device. As shown by reference number 106, based on determining that the BIER label in the BIER-encapsulated multicast packet is the BIER label associated with the non-BIER device, the non-BIER device may label switch the BIER-encapsulated multicast packet by replacing the BIER label in the BIER-encapsulated multicast packet with a BIER label associated with the BIER proxy device. In this way, the non-BIER device performs a BIER label switch so that the BIER-encapsulated multicast packet is redirected to the BIER proxy device. In this way, the BIER proxy device may perform one or more BIER functions on the BIER-encapsulated multicast packet for the non-BIER device.

Figure 1D:
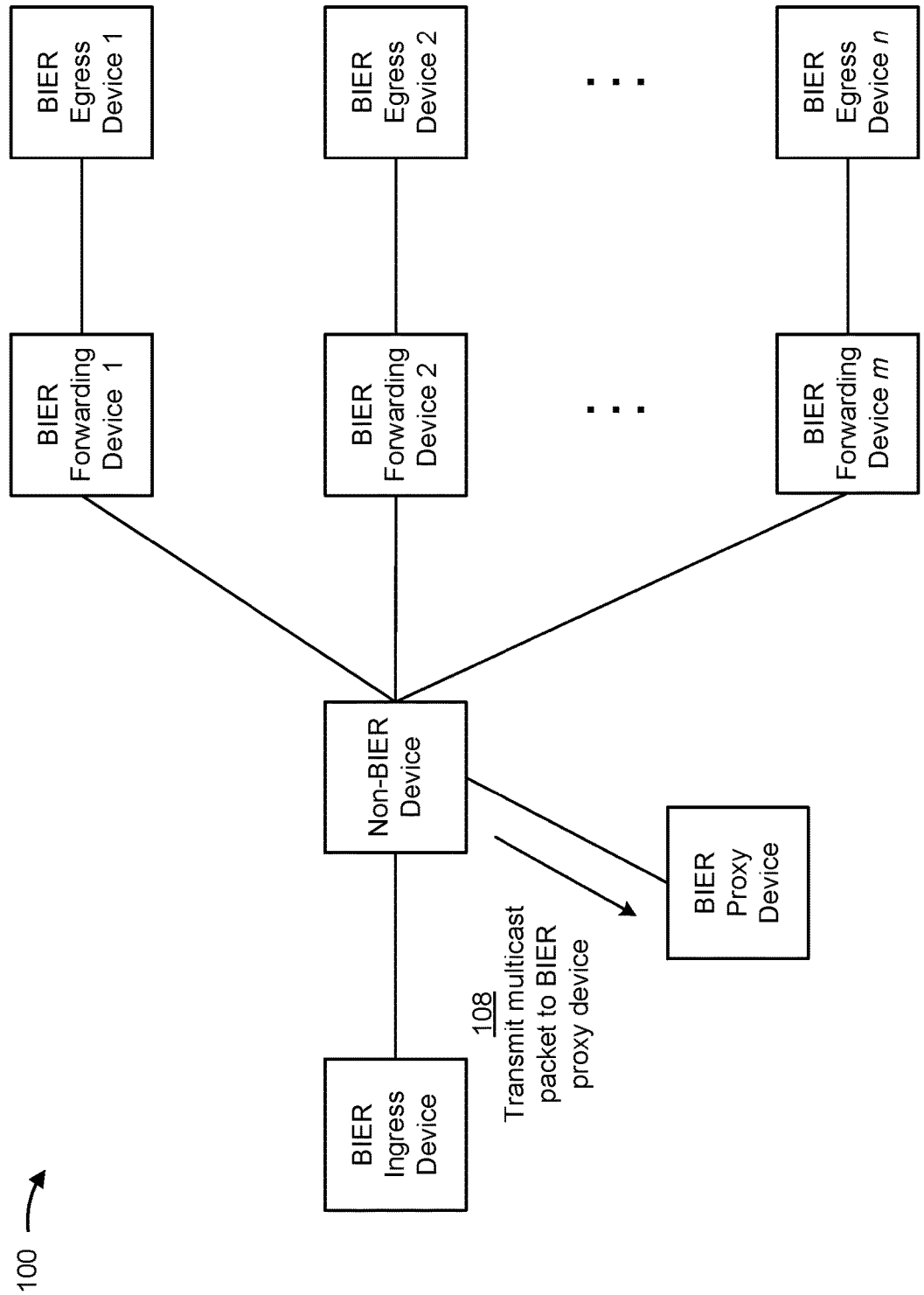

Turning now to FIG. 1D, and as shown reference number 108, the non-BIER device may transmit the BIER-encapsulated multicast packet to the BIER proxy device based on replacing the BIER label in the BIER-encapsulated multicast packet with a BIER label associated with the BIER proxy device.

Figure 1E:
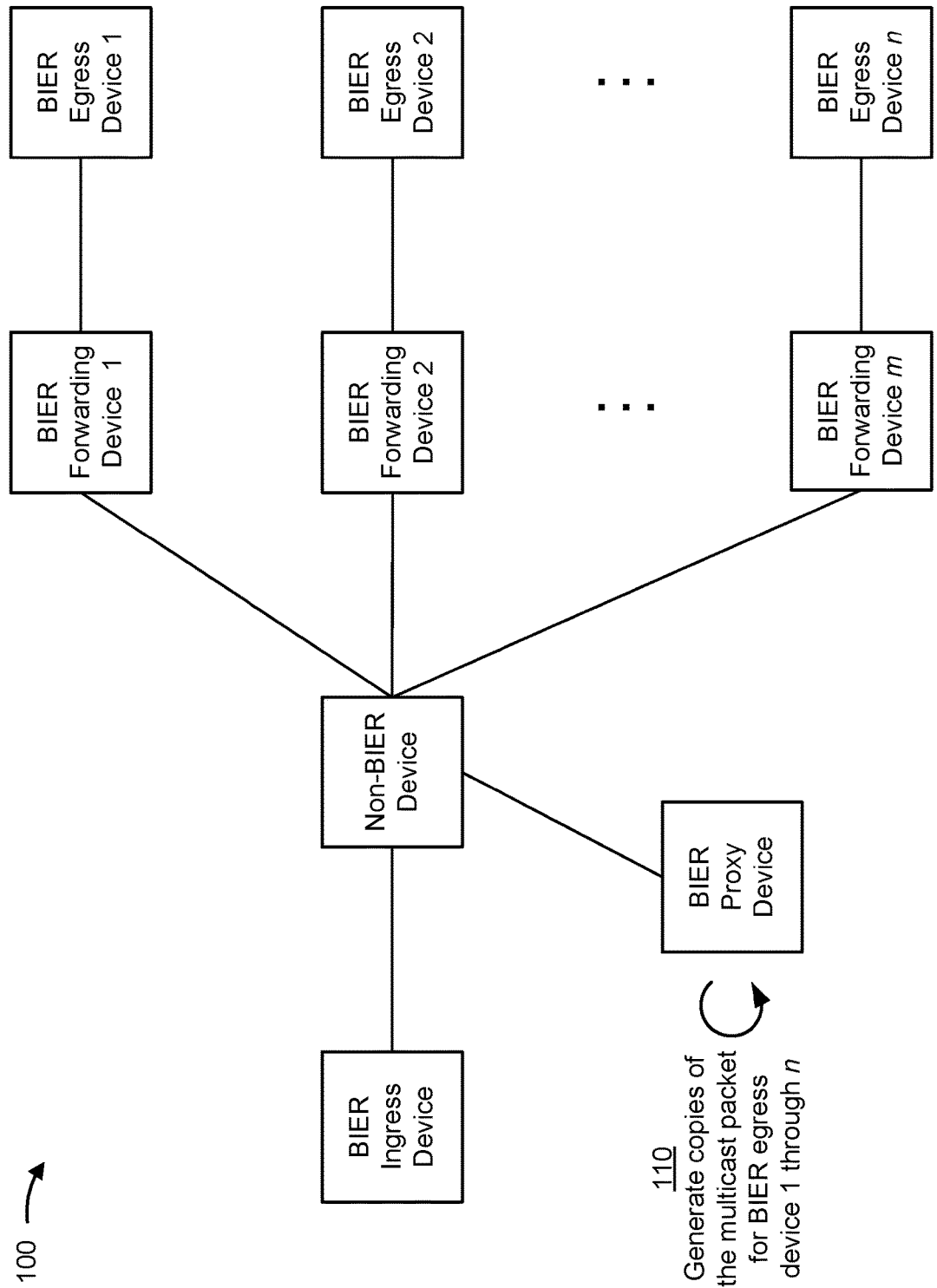

Turning now to FIG. 1E, the BIER proxy device may receive the BIER-encapsulated multicast packet from the non-BIER device. The BIER proxy device may be configured such that the BIER proxy device knows that the non-BIER device does not support BIER. For example, the BIER proxy device may automatically configure the BIER proxy device based on the non-BIER device transmitting, to the BIER proxy device, information indicating that the non-BIER device does not support BIER (e.g., by using control plane signaling), based on being statically configured to know that the non-BIER device does not support BIER, and/or the like. Accordingly, when the BIER proxy device receives the BIER-encapsulated multicast packet from the non-BIER device and determines that the BIER label, included in the BIER-encapsulated multicast packet, is associated with the BIER proxy device, the BIER proxy device knows to perform one or more BIER functions for the non-BIER device.

As shown by reference number 110, the BIER proxy device may identify the BIER label, associated with the BIER proxy device, included in the BIER-encapsulated multicast packet, and may replicate the BIER-encapsulated multicast packet by generating a plurality of copies of the BIER-encapsulated multicast packet based on identifying the BIER label associated with the BIER proxy device. In this way, since the non-BIER device does not include forwarding plane hardware that can perform the replication, the BIER proxy device performs the replication of the BIER-encapsulated multicast packet for the non-BIER device.

In some implementations, the BIER proxy device may generate the plurality of copies of the BIER-encapsulated multicast packet such that each copy, of the plurality of copies of the BIER-encapsulated multicast packet, is associated with a respective BIER egress device. For example, the BIER proxy device may analyze the bit string included in the BIER header of the BIER-encapsulated multicast packet to determine that the bit string includes information identifying BIER egress device 1, BIER egress device 2, and BIER egress device n. Accordingly, the BIER proxy device may generate a first copy of the BIER-encapsulated multicast packet associated with BIER egress device 1, a second copy of the BIER-encapsulated multicast packet associated with BIER egress device 2, and a third copy of the BIER-encapsulated multicast packet associated with BIER egress device n.

The BIER proxy device may generate a copy of the BIER-encapsulated multicast packet by modifying the BIER header of the BIER-encapsulated multicast packet and replacing the BIER label included in the BIER-encapsulated packet. The BIER proxy device may modify the BIER header of the BIER-encapsulated multicast packet and replace the BIER label included in the BIER-encapsulated packet based on a BIER egress device associated with the copy of the BIER-encapsulated multicast packet. For example, if the copy of the BIER-encapsulated multicast packet is associated with BIER egress device 1, the BIER proxy device may perform a lookup in a BIFT associated with the BIER proxy device to identify the BIER identifier associated with BIER egress device 1 (e.g., 0001), may identify a bit forwarding neighbor device that is a next hop in a path to BIER egress device 1 (e.g., BIER forwarding device 1), and may identify a forwarding bit mask associated with the bit forwarding neighbor device. In the example shown in FIGS. 1A-1H, BIER egress device 1 is the only BIER egress device reachable via BIER forwarding device 1, and accordingly the forwarding bit mask associated with BIER forwarding device 1 is the BIER identifier of BIER egress device 1 (i.e., 0001). Accordingly, the BIER proxy device may set the bit mask in the BIER header of the copy of the BIER-encapsulated multicast packet associated with BIER egress device 1 to 0001. The BIER proxy device may also set the BIER label included in the BIER-encapsulated multicast packet to be the BIER label associated with BIER forwarding device 1. The BIER proxy device may generate copies of the BIER-encapsulated multicast packet for BIER egress device 2 and BIER egress device n in a similar manner.

Since the BIER proxy device is tunneling the plurality of copies of the BIER-encapsulated multicast packets through the non-BIER device (i.e., the BIER proxy device transmits the plurality of copies of the BIER-encapsulated multicast packets to the non-BIER device via a unicast tunnel, and the non-BIER device transmits each copy, of the plurality of copies of the BIER-encapsulated multicast packets, to a respective BIER forwarding device via a respective unicast tunnel), the BIER proxy device may add an additional encapsulation layer to each copy, of the plurality of copies of the BIER-encapsulated multicast packets, when generating the plurality of copies of the BIER-encapsulated multicast packets. The additional encapsulation layer for a copy of the BIER-encapsulated multicast packet may include a header that the non-BIER device is configured to recognize and process, such as a MPLS header, a UDP header, an Ethernet header, and/or the like. In this way, the copy of the BIER-encapsulated multicast packet becomes the payload for the additional encapsulation layer until the copy of the BIER-encapsulated packet reaches a BIER-enabled network device (e.g., BIER forwarding device 1), which removes (or pops off) the additional encapsulation layer and continues to forward the copy of the BIER-encapsulated multicast packet using BIER.

Turning now to FIG. 1F, and as shown by reference number 112, the BIER proxy device may transmit the plurality of copies of the BIER-encapsulated multicast packet. As explained above, the plurality of copies of the BIER-encapsulated multicast packet may include an additional encapsulation layer for tunneling the plurality of copies of the BIER-encapsulated multicast packet to the non-BIER device. Accordingly, the BIER proxy device may transmit the plurality of copies of the BIER-encapsulated multicast packet via a unicast tunnel using the additional encapsulation layer included in the plurality of copies of the BIER-encapsulated multicast packet.

Figure 1G:
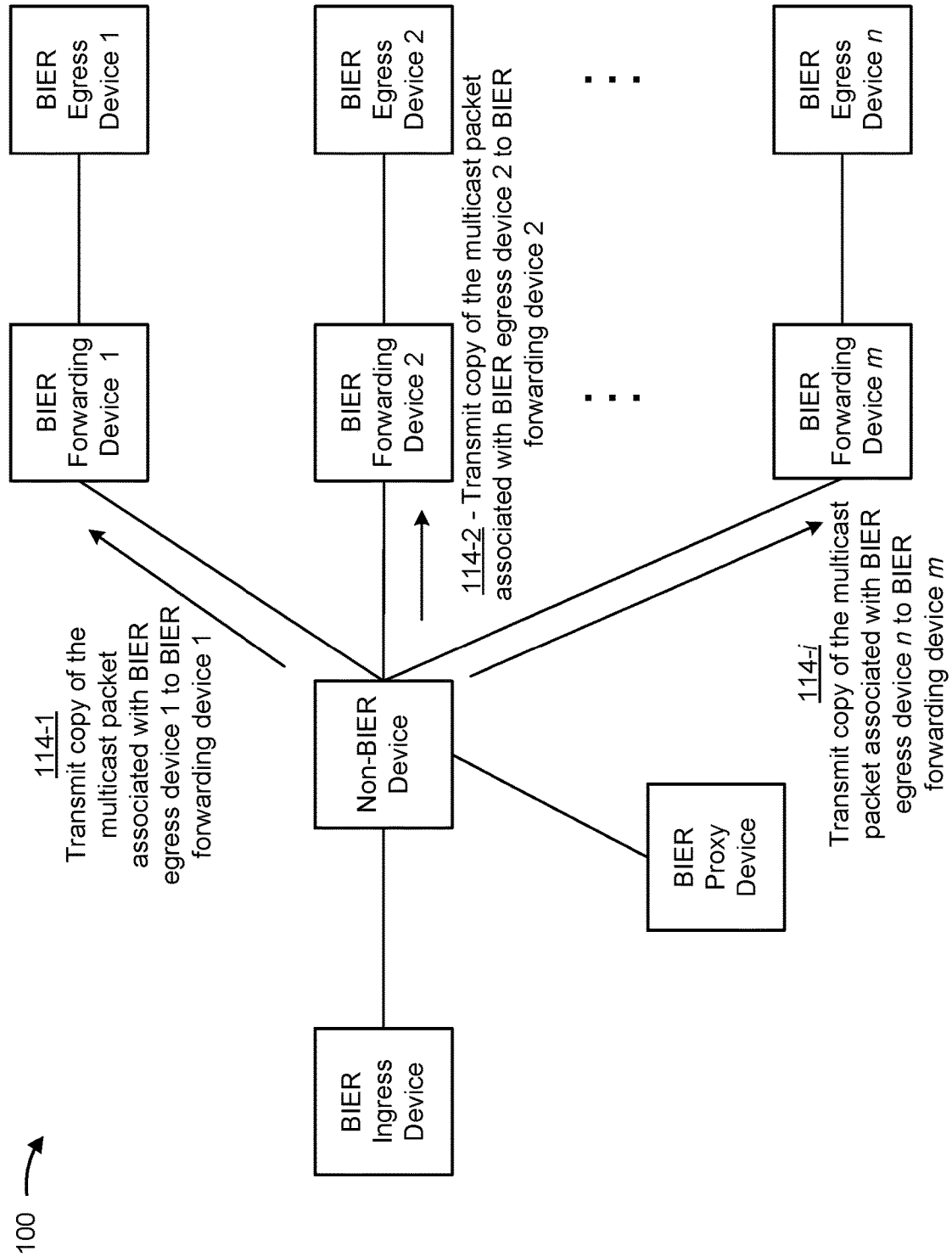

Turning now to FIG. 1G, the non-BIER device may receive the plurality of copies of the BIER-encapsulated multicast packet. As shown by reference numbers 114-1 through 114-i, the non-BIER device may identify the additional layer of encapsulation included in the plurality of copies of the BIER-encapsulated multicast packet, and may tunnel, based on the additional encapsulation layer, a copy, of the plurality of copies of the BIER-encapsulated multicast packet, to each respective BIER forwarding device via a respective unicast tunnel. For example, the non-BIER device may transmit a first copy of the BIER-encapsulated multicast packet associated with BIER egress device 1 to BIER forwarding device 1 via a first unicast tunnel (reference number 114-1), may transmit a second copy of the BIER-encapsulated multicast packet associated with BIER egress device 2 to BIER forwarding device 2 via a second unicast tunnel (reference number 114-2), may transmit a third copy of the BIER-encapsulated multicast packet associated with BIER egress device n to BIER forwarding device m via a third unicast tunnel (reference number 1144), and so on.

Figure 1H:
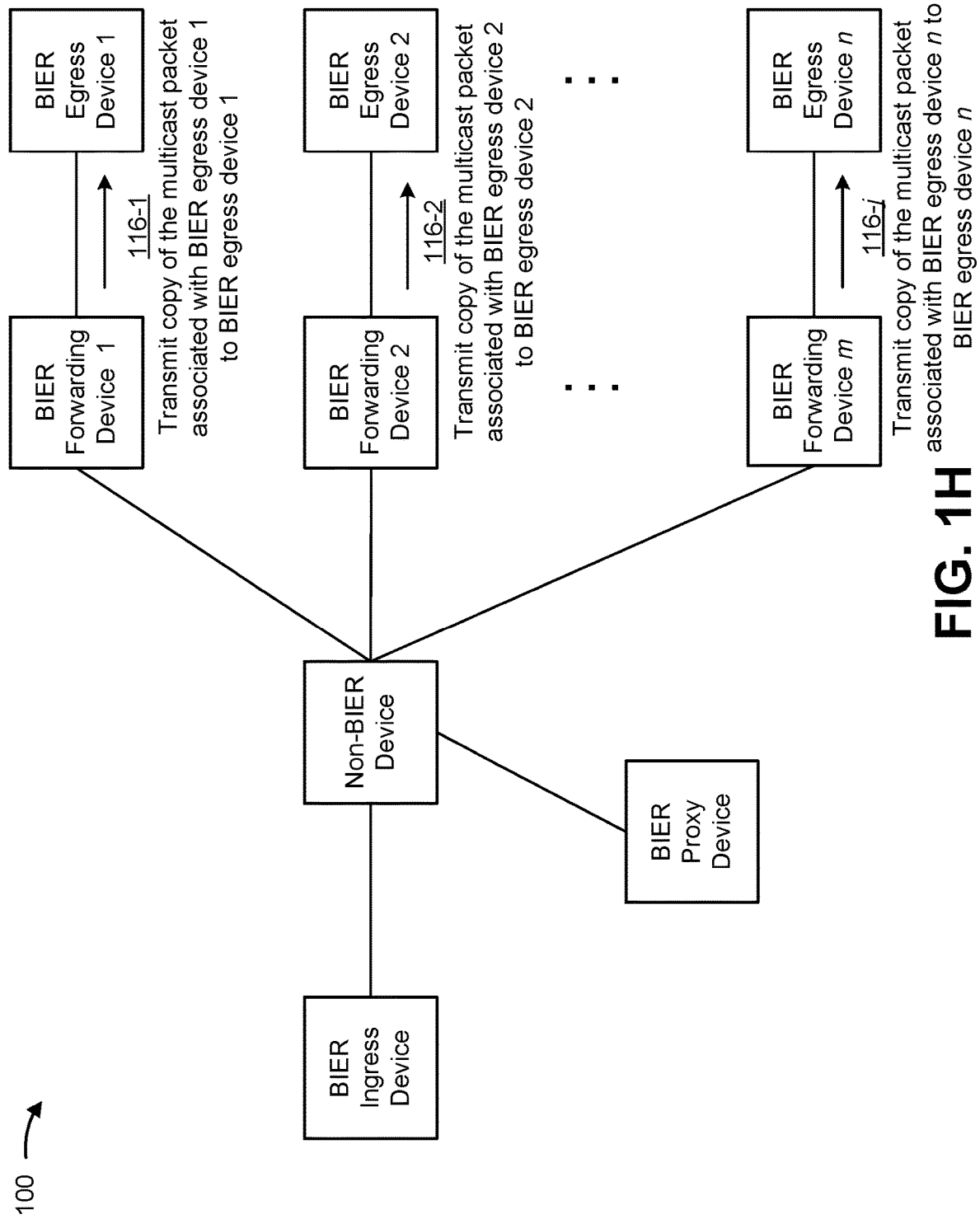

Turning now to FIG. 1H, each BIER forwarding device may receive a respective copy, of the plurality of copies of the BIER-encapsulated multicast packet and may remove (or pop off) the additional encapsulation layer included in the respective copy. For example, BIER forwarding device 1 may receive a respective copy, of the plurality of copies of the BIER-encapsulated multicast packet, associated with BIER egress device 1, and may remove the additional encapsulation layer from the respective copy, and so on.

As shown by reference numbers 116-1 through 116-j, each BIER forwarding device may transmit a respective copy, of the plurality of copies of the BIER-encapsulated multicast packet, to a respective BIER egress device. For example, BIER forwarding device 1 may receive a first respective copy, of the plurality of copies of the BIER-encapsulated multicast packet, associated with BIER egress device 1 and may transmit the first respective copy to BIER egress device 1, BIER forwarding device 2 may receive a second respective copy, of the plurality of copies of the BIER-encapsulated multicast packet, associated with BIER egress device 2 and may transmit the second respective copy to BIER egress device 2, and so on.

To transmit a copy, of the plurality of copies of the BIER-encapsulated multicast packet to a BIER egress device (e.g., BIER egress device 1), a BIER forwarding device (e.g., BIER forwarding device 1) may analyze a BIER header included in the copy of the BIER-encapsulated multicast packet to identify a bit string included in the BIER header. BIER forwarding device 1 may analyze the bit string included in the BIER header to determine a BIER identifier based on information included in the bit string. For example, BIER forwarding device 1 may determine that the bit string included in the BIER header is 0001 (i.e., the BIER identifier associated with BIER egress device 1) and may perform a lookup in a BIFT to identify the BIER identifier in the BIFT. BIER forwarding device 1 may identify BIER identifier 0001 based on information included in the BIFT and may determine that BIER identifier 0001 is associated with a forwarding bit mask of 0001, which is associated with a bit forwarding neighbor corresponding to BIER egress device 1. Accordingly, BIER forwarding device 1 may determine that the bit forwarding neighbor associated with the copy of the BIER-encapsulated multicast packet is a destination of the copy of the BIER-encapsulated multicast packet, may replace a BIER label included in the copy of the BIER-encapsulated multicast packet with a BIER label (e.g., an implicit null label) that instructs the BIER egress device 1 to remove (or pop off) the BIER label and the BIER header when BIER egress device 1 receives the copy of the BIER-encapsulated multicast packet, and may transmit the copy of the BIER-encapsulated multicast packet to BIER egress device 1.

The BIER egress devices may each receive a respective copy of the plurality of copies of the BIER-encapsulated multicast packet, may remove a BIER label and a BIER header included in the respective copy of the plurality of copies of the BIER-encapsulated multicast packet, and may transmit a respective copy of the multicast packet to one or more other network devices (e.g., one or more other network devices in another network, one or more other network devices in another BIER domain, and/or the like).

In this way, the BIER proxy device may perform one or more BIER functions on a BIER-encapsulated multicast packet, received by the non-BIER device, for the non-BIER device instead of the BIER ingress device replicating and transmitting a plurality of copies of the BIER-encapsulated multicast packet to the non-BIER device via one or more tunnels. In this way, if the connection between the BIER ingress device and the non-BIER device is a low-bandwidth and/or long-distance connection, the BIER ingress device may transmit the BIER-encapsulated multicast packet to the non-BIER device without using a tunnel, and the BIER proxy device may instead replicate the BIER-encapsulated packet and may transmit copies of the BIER-encapsulated multicast packets to the non-BIER device using a tunnel on a high-bandwidth and/or short-distance connection. In this way, the tunneling does not cause an increase in latency and/or dropped BIER-encapsulated multicast packets in the BIER domain.

As indicated above, FIGS. 1A-1H are provided merely as an example. Other examples are possible and may differ from what was described with regard to FIGS. 1A-1H.

Figure 2:
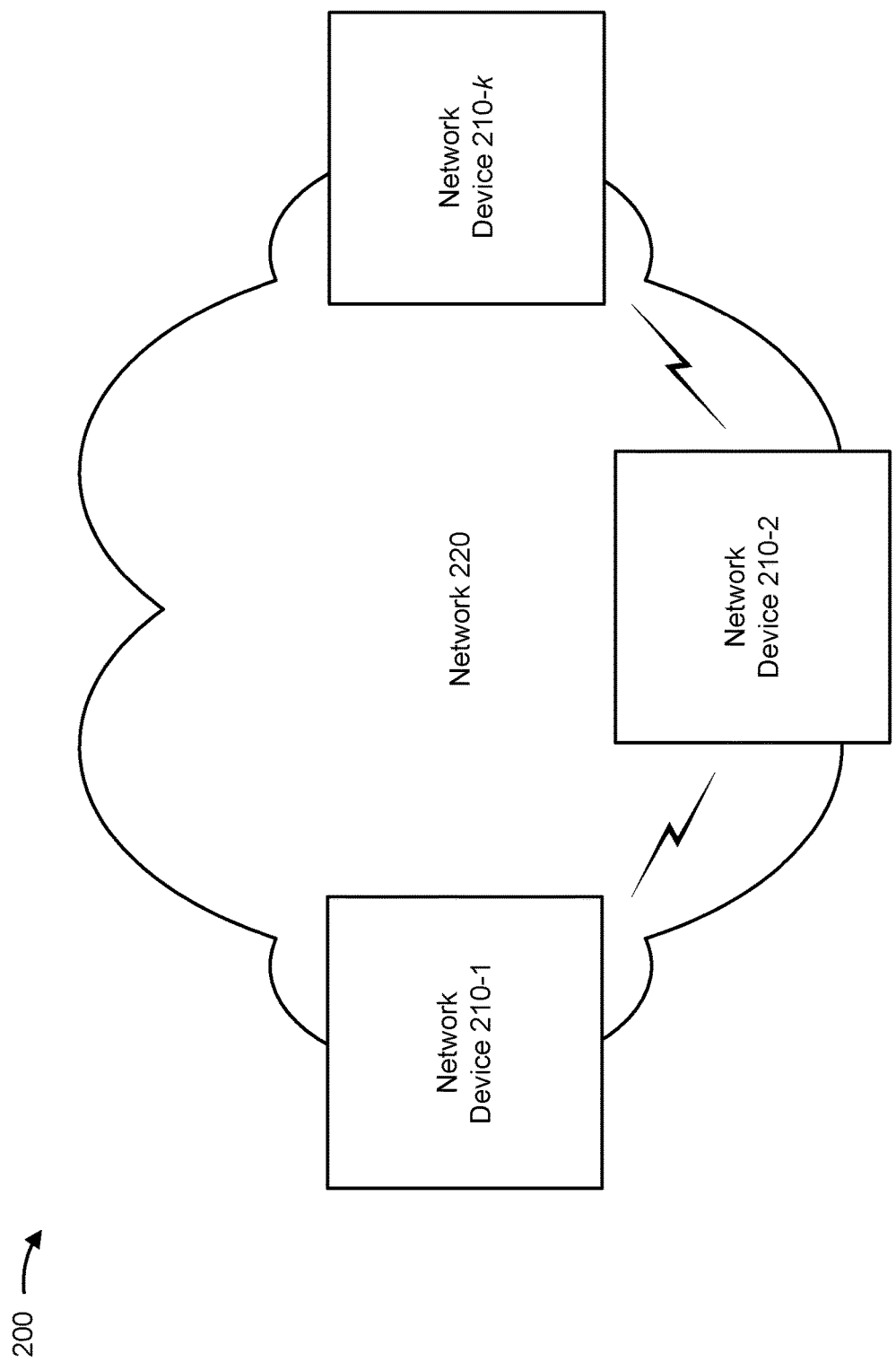
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-$k$ ($k \geq 1$) (hereinafter referred to collectively as "network devices 210," and individually as "network device 210") and a network 220. Devices of environment 200 may interconnect via wired connections, wireless connections, or a combination of wired and wireless connections.

Network device 210 includes one or more devices capable of receiving, providing, storing, generating, and/or processing information. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device implemented within a housing, such as a chassis. In some implementations, network device 210 may be implemented as a virtual device implemented by one or more computer devices of a cloud computing environment or a data center.

In some implementations, network device 210 may be a BIER-enabled device that supports BIER for forwarding multicast data packets between network devices 210 that are BIER-enabled devices. For example, network device 210 may be a BIER ingress device that functions as an entry point for multicast packets into a BIER domain, may be a BIER egress device that functions as an exit point for multicast packets in the BIER domain, may be a BIER forwarding device that transmits BIER-encapsulated multicast packets to one or more other network devices within a BIER domain, may be a BIER proxy device that performs BIER functions for a non-BIER device, and/or the like. In some implementations, a single network device 210 may function as a single one of a BIER ingress device, a BIER egress device, a BIER forwarding device, or a BIER proxy device. In some implementations, a single network device 210 may function as multiple ones of a BIER ingress device, a BIER egress device, a BIER forwarding device, or a BIER proxy device.

Alternatively, network device 210 may be a non-BIER device that does not support BIER. For example, network device 210 may be a non-BIER device that transmits information, to a BIER-enabled device in network 220, that indicates network device 210 supports BIER when network device 210 actually does not. In this way, the BIER-enabled device may transmit a BIER-encapsulated multicast packet to network device 210, and network device 210 may transmit the BIER-encapsulated multicast packet to a BIER proxy device, which may perform one or more BIER actions for network device 210.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, etc.), a public land mobile network (PLMN), a LAN, a WAN, a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
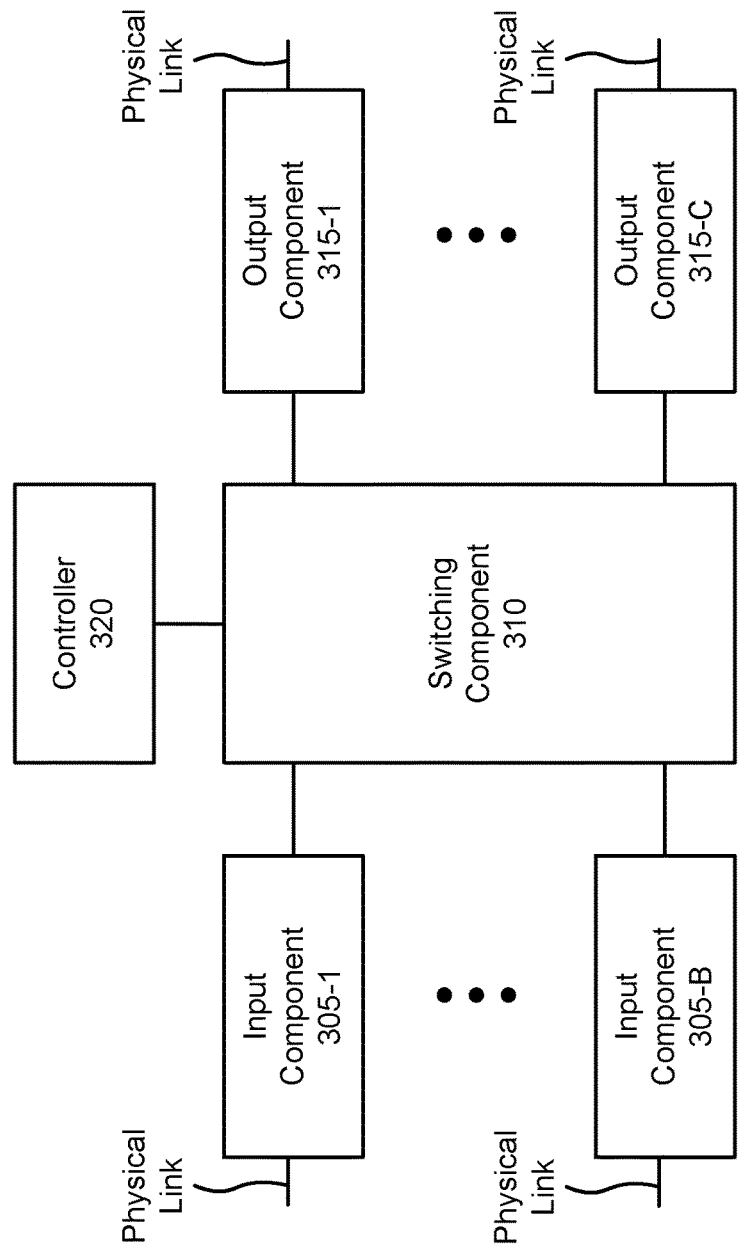
FIG. 3 is a diagram of example components of one or more devices of FIG. 2.

FIG. 3 is a diagram of example components of a device 300. Device 300 may correspond to one or more of network devices 210. In some implementations, one or more of network devices 210 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
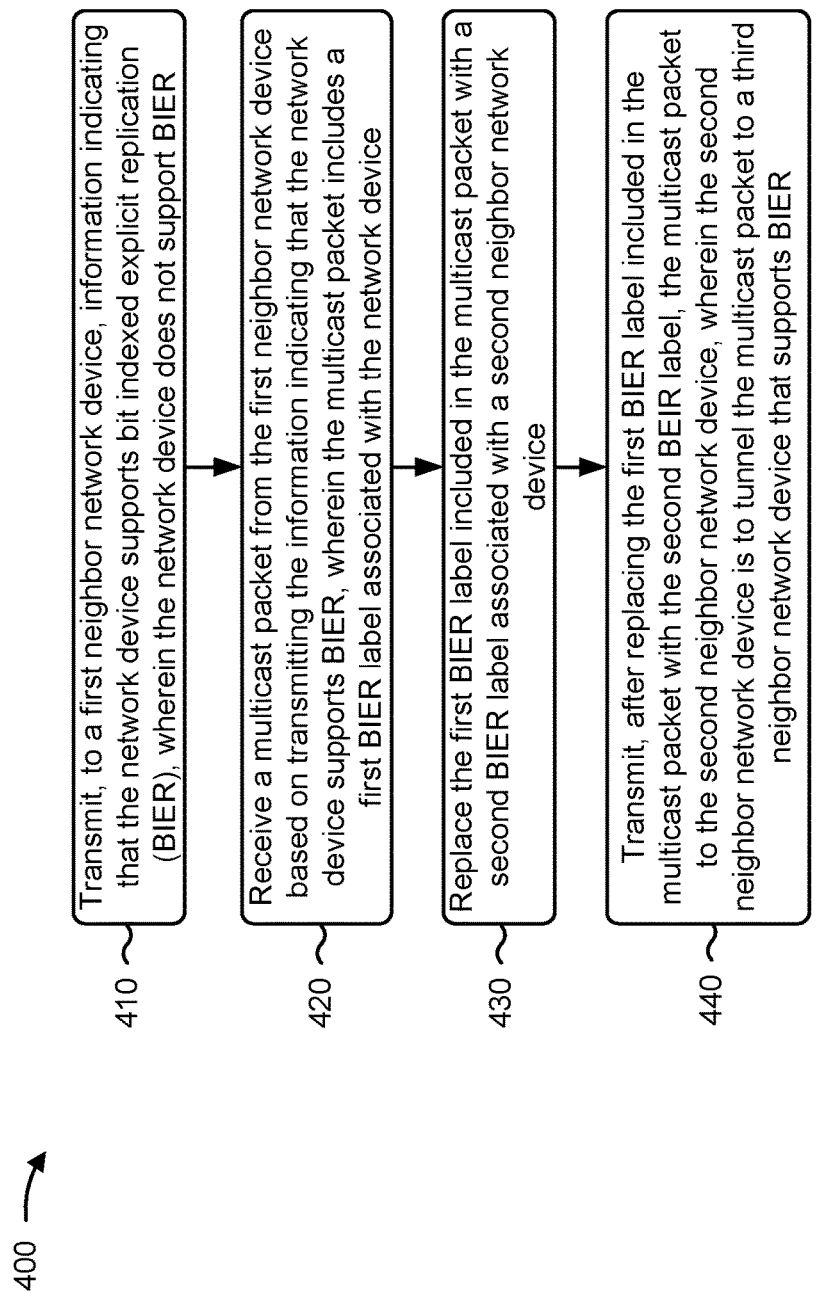
FIG. 4 is a flow chart of an example process for forwarding multicast data packets using BIER for BIER-incapable network devices.

FIG. 4 is a flow chart of an example process 400 for forwarding multicast data packets using BIER for BIER-incapable network devices. In some implementations, one or more process blocks of FIG. 4 may be performed by a network device (e.g., network device 210). In some implementations, one or more process blocks of FIG. 4 may be performed by another device or a group of devices separate from or including the network device, such as a different network device 210 and/or a plurality of network devices 210.

As shown in FIG. 4, process 400 may include transmitting, to a first neighbor network device, information indicating that the network device supports BIER, wherein the network device does not support BIER (block 410). For example, the network device (e.g., using input component 305, switching component 310, output component 315, controller 320, and/or the like) may transmit, to a first neighbor network device, information indicating that the network device supports BIER, as described above in connection with FIGS. 1A-1H. In some implementations, the network device may not support BIER.

As further shown in FIG. 4, process 400 may include receiving a multicast packet from the first neighbor network device based on transmitting the information indicating that the network device supports BIER, wherein the multicast packet includes a first BIER label associated with the network device (block 420). For example, the network device (e.g., using input component 305, switching component 310, output component 315, controller 320, and/or the like) may receive a multicast packet from the first neighbor network device based on transmitting the information indicating that the network device supports BIER, as described above in connection with FIGS. 1A-1H. In some implementations, the multicast packet may include a first BIER label associated with the network device.

As further shown in FIG. 4, process 400 may include replacing the first BIER label included in the multicast packet with a second BIER label associated with a second neighbor network device (block 430). For example, the network device (e.g., using input component 305, switching component 310, output component 315, controller 320, and/or the like) may replace the first BIER label included in the multicast packet with a second BIER label associated with a second neighbor network device, as described above in connection with FIGS. 1A-1H.

As further shown in FIG. 4, process 400 may include transmitting, after replacing the first BIER label included in the multicast packet with the second BIER label, the multicast packet to the second neighbor network device, wherein the second neighbor network device may be to tunnel the multicast packet to a third neighbor network device that supports BIER (block 440). For example, the network device (e.g., using input component 305, switching component 310, output component 315, controller 320, and/or the like) may transmit, after replacing the first BIER label included in the multicast packet with the second BIER label, the multicast packet to the second neighbor network device, as described above in connection with FIGS. 1A-1H. In some implementations, the second neighbor network device may be to tunnel the multicast packet to a third neighbor network device that supports BIER.

Process 400 may include additional implementations, such as any single implementation or any combination of implementations described below and/or described with regard to any other process described herein.

In some implementations, the second neighbor network device is to tunnel the multicast packet to one or more third neighbor network devices through the network device. In some implementations, the network device may receive the second BIER label from the second neighbor network device, and may replace the first BIER label included in the multicast packet with the second BIER label based on receiving the second BIER label from the second neighbor network device. In some implementations, the plurality of copies of the multicast packet may be encapsulated in an additional encapsulation layer. In some implementations, the second neighbor network device may be provisioned with information indicating that the network device does not support BIER. In some implementations, the information indicating that the network device supports BIER may include the first BIER label. In some implementations, the network device may transmit, to the second neighbor network device, information indicating that the network device does not support BIER.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
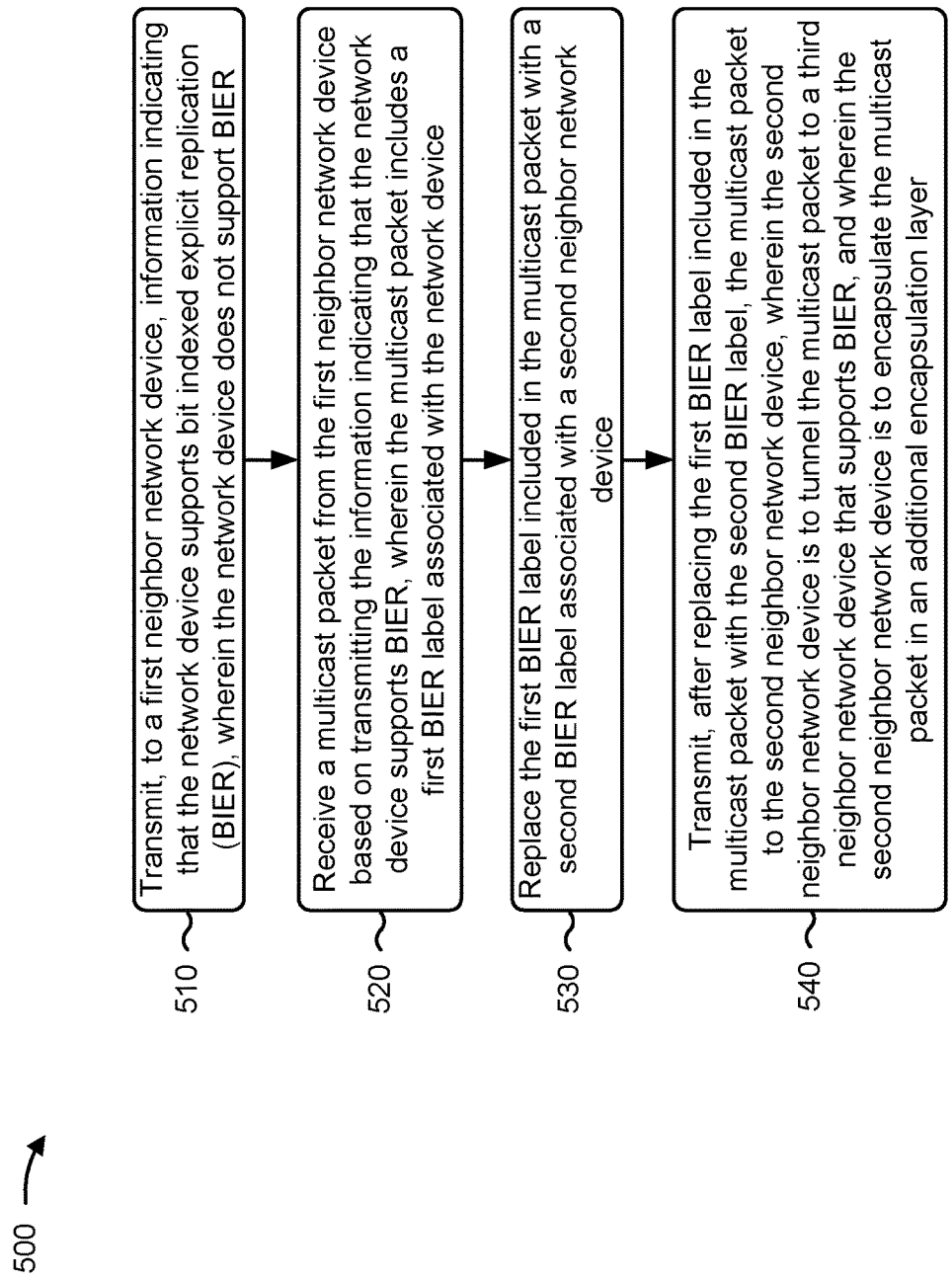
FIG. 5 is a flow chart of an example process for forwarding multicast data packets using BIER for BIER-incapable network devices.

FIG. 5 is a flow chart of an example process 500 for forwarding multicast data packets using BIER for BIER-incapable network devices. In some implementations, one or more process blocks of FIG. 5 may be performed by a network device (e.g., network device 210). In some implementations, one or more process blocks of FIG. 5 may be performed by another device or a group of devices separate from or including the network device, such as a different network device 210 and/or a plurality of network devices 210.

As shown in FIG. 5, process 500 may include transmitting, to a first neighbor network device, information indicating that the network device supports BIER, wherein the network device does not support BIER (block 510). For example, the network device (e.g., using input component 305, switching component 310, output component 315, controller 320, and/or the like) may transmit, to a first neighbor network device, information indicating that the network device supports BIER, as described above in connection with FIGS. 1A-1H. In some implementations, the network device may not support BIER.

As further shown in FIG. 5, process 500 may include receiving a multicast packet from the first neighbor network device based on transmitting the information indicating that the network device supports BIER, wherein the multicast packet includes a first BIER label associated with the network device (block 520). For example, the network device (e.g., using input component 305, switching component 310, output component 315, controller 320, and/or the like) may receive a multicast packet from the first neighbor network device based on transmitting the information indicating that the network device supports BIER, as described above in connection with FIGS. 1A-1H. In some implementations, the multicast packet may include a first BIER label associated with the network device.

As further shown in FIG. 5, process 500 may include replacing the first BIER label included in the multicast packet with a second BIER label associated with a second neighbor network device (block 530). For example, the network device (e.g., using input component 305, switching component 310, output component 315, controller 320, and/or the like) may replace the first BIER label included in the multicast packet with a second BIER label associated with a second neighbor network device, as described above in connection with FIGS. 1A-1H.

As further shown in FIG. 5, process 500 may include transmitting, after replacing the first BIER label included in the multicast packet with the second BIER label, the multicast packet to the second neighbor network device, wherein the second neighbor network device may be to tunnel the multicast packet to a third neighbor network device that supports BIER, and may be to encapsulate the multicast packet in an additional encapsulation layer (block 540). For example, the network device (e.g., using input component 305, switching component 310, output component 315, controller 320, and/or the like) may transmit, after replacing the first BIER label included in the multicast packet with the second BIER label, the multicast packet to the second neighbor network device, as described above in connection with FIGS. 1A-1H. In some implementations, the second neighbor network device may be to tunnel the multicast packet to a third neighbor network device that supports BIER, and may be to encapsulate the multicast packet in an additional encapsulation layer.

Process 500 may include additional implementations, such as any single implementation or any combination of implementations described below and/or described with regard to any other process described herein.

In some implementations, the additional encapsulation layer may include a multiprotocol label switching (MPLS) header, a user datagram protocol (UDP) header, or an Ethernet header. In some implementations, the network device may transmit, to the second neighbor network device, information indicating that the network device does not support BIER.

In some implementations, the network device may receive the second BIER label from the second neighbor network device, and may replace the first BIER label included in the multicast packet with the second BIER label based on receiving the second BIER label from the second neighbor network device.

In some implementations, the information indicating that the network device supports BIER may include the first BIER label. In some implementations, the second neighbor network device may be to tunnel a plurality of copies of the multicast packet to a plurality of fourth neighbor network devices through the network device. In some implementations, the second neighbor network device may be provisioned with information indicating that the network device does not support BIER.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for forwarding multicast data packets using BIER for BIER-incapable network devices. In some implementations, one or more process blocks of FIG. 6 may be performed by a network device (e.g., network device 210). In some implementations, one or more process blocks of FIG. 6 may be performed by another device or a group of devices separate from or including the network device, such as a different network device 210 and/or a plurality of network devices 210.

As shown in FIG. 6, process 600 may include transmitting, to a first neighbor network device, information indicating that the network device supports BIER, wherein the network device does not support BIER (block 610). For example, the network device (e.g., using input component 305, switching component 310, output component 315, controller 320, and/or the like) may transmit, to a first neighbor network device, information indicating that the network device supports BIER, as described above in connection with FIGS. 1A-1H. In some implementations, the network device may not support BIER.

As further shown in FIG. 6, process 600 may include receiving a multicast packet from the first neighbor network device based on transmitting the information indicating that the network device supports BIER, wherein the multicast packet includes a first BIER label associated with the network device (block 620). For example, the network device (e.g., using input component 305, switching component 310, output component 315, controller 320, and/or the like) may receive a multicast packet from the first neighbor network device based on transmitting the information indicating that the network device supports BIER, as described above in connection with FIGS. 1A-1H. In some implementations, the multicast packet includes a first BIER label associated with the network device.

As further shown in FIG. 6, process 600 may include replacing the first BIER label included in the multicast packet with a second BIER label associated with a second neighbor network device (block 630). For example, the network device (e.g., using input component 305, switching component 310, output component 315, controller 320, and/or the like) may replace the first BIER label included in the multicast packet with a second BIER label associated with a second neighbor network device, as described above in connection with FIGS. 1A-1H.

As further shown in FIG. 6, process 600 may include transmitting, after replacing the first BIER label included in the multicast packet with the second BIER label, the multicast packet to the second neighbor network device, wherein the second neighbor network device may be to tunnel the multicast packet to a third neighbor network device that supports BIER through the network device, and may be to encapsulate the multicast packet in an additional encapsulation layer (block 640). For example, the network device (e.g., using input component 305, switching component 310, output component 315, controller 320, and/or the like) may transmit, after replacing the first BIER label included in the multicast packet with the second BIER label, the multicast packet to the second neighbor network device, as described above in connection with FIGS. 1A-1H. In some implementations, the second neighbor network device may be to tunnel the multicast packet to a third neighbor network device that supports BIER through the network device, and may be to encapsulate the multicast packet in an additional encapsulation layer.

Process 600 may include additional implementations, such as any single implementation or any combination of implementations described below and/or described with regard to any other process described herein.

In some implementations, the information indicating that the network device supports BIER may include the first BIER label. In some implementations, a first connection between the network device and the second neighbor network device may have greater bandwidth relative to a second connection between the network device and the first neighbor network device.

In some implementations, the second neighbor network device may be provisioned with information indicating that the network device does not support BIER or may receive the information indicating that the network device does not support BIER from the network device. In some implementations, the tunnel may be a unicast tunnel or a multicast tunnel.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a BIER-enabled device, of network devices 210, determines that a non-BIER device, of network devices 210, supports BIER when the non-BIER device actually does not. As a result, the BIER-enabled device, of network devices 210, may transmit a first BIER-encapsulated multicast packet to the non-BIER device, of network devices 210, without additional encapsulation for unicast tunneling the first BIER-encapsulated multicast packet to the non-BIER device. In this way, bandwidth resource usage on the connection between the BIER-enabled device and the non-BIER device is reduced, which improves latency on the connection and allows the connection to be long-distance and/or low-bandwidth.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors to:
transmit, to a first neighbor network device that is communicatively connected to the network device, information indicating that the network device supports bit indexed explicit replication (BIER),
wherein the network device does not support BIER;
receive a multicast packet from the first neighbor network device based on transmitting the information indicating that the network device supports BIER,
wherein the multicast packet includes a first BIER label associated with the network device,
wherein the first BIER label indicates that the network device supports BIER;
replace the first BIER label included in the multicast packet with a second BIER label associated with a second neighbor network device that is communicatively connected to the network device,
wherein the second neighbor network device is a BIER-enabled network device that performs BIER functions for the network device; and
transmit, after replacing the first BIER label included in the multicast packet with the second BIER label, the multicast packet to the second neighbor network device to cause the second neighbor network device to tunnel the multicast packet to a third neighbor network device that supports BIER.

2. The network device of claim 1, wherein the one or more processors, when transmitting the multicast packet to the second neighbor network device, are to:
transmit the multicast packet to the second neighbor network device to further cause the second neighbor network device to tunnel the multicast packet to one or more third neighbor network devices through the network device.

3. The network device of claim 1, wherein the one or more processors are further to:
receive the second BIER label from the second neighbor network device,
wherein the one or more processors, when replacing the first BIER label included in the multicast packet with the second BIER label, are to:
replace the first BIER label included in the multicast packet with the second BIER label based on receiving the second BIER label from the second neighbor network device.

4. The network device of claim 1, wherein a plurality of copies of the multicast packet is encapsulated in an additional encapsulation layer.

5. The network device of claim 1, wherein the one or more processors, when transmitting the multicast packet to the second neighbor network device, are to:
transmit the multicast packet to the second neighbor network device to further cause the second neighbor network device to be provisioned with information indicating that the network device does not support BIER.

6. The network device of claim 1, wherein the one or more processors are further to:
transmit, to the second neighbor network device, information indicating that the network device does not support BIER.

7. The network device of claim 1, wherein the one or more processors, when transmitting the information indicating that the network device supports BIER, are to:
transmit the information via interior gateway protocol (IGP) control plane signaling.

8. A non-transitory computer-readable medium storing instructions, the instructions comprising:
one or more instructions that, when executed by one or more processors of a network device, cause the one or more processors to:
transmit, to a first neighbor network device that is communicatively connected to the network device, information indicating that the network device supports bit indexed explicit replication (BIER),
wherein the network device does not support BIER;
receive a multicast packet from the first neighbor network device based on transmitting the information indicating that the network device supports BIER,
wherein the multicast packet includes a first BIER label associated with the network device, wherein the first BIER label indicates that the network device supports BIER;
replace the first BIER label included in the multicast packet with a second BIER label associated with a second neighbor network device that is communicatively connected to the network device,
wherein the second neighbor network device is a BIER-enabled network device that performs BIER functions for the network device; and
transmit, after replacing the first BIER label included in the multicast packet with the second BIER label, the multicast packet to the second neighbor network device to cause the second neighbor network device to:
tunnel the multicast packet to a third neighbor network device that supports BIER, and
encapsulate the multicast packet in an additional encapsulation layer.

9. The non-transitory computer-readable medium of claim 8, wherein the additional encapsulation layer includes at least one of:
a multiprotocol label switching (MPLS) header,
a user datagram protocol (UDP) header, or
an Ethernet header.

10. The non-transitory computer-readable medium of claim 8, wherein the one or more instructions, when executed by the one or more processors, further cause the one or more processors to:
transmit, to the second neighbor network device, information indicating that the network device does not support BIER.

11. The non-transitory computer-readable medium of claim 8, wherein the one or more instructions, when executed by the one or more processors, further cause the one or more processors to:
receive the second BIER label from the second neighbor network device,
wherein the one or more instructions, that cause the one or more processors to replace the first BIER label included in the multicast packet with the second BIER label, cause the one or more processors to:
replace the first BIER label included in the multicast packet with the second BIER label based on receiving the second BIER label from the second neighbor network device.

12. The non-transitory computer-readable medium of claim 8, wherein the one or more instructions, that cause the one or more processors to transmit the multicast packet to the second neighbor network device, cause the one or more processors to:
transmit the multicast packet to the second neighbor network device to further cause the second neighbor network device to tunnel a plurality of copies of the multicast packet to a plurality of fourth neighbor network devices through the network device.

13. The non-transitory computer-readable medium of claim 8, wherein the one or more instructions, that cause the one or more processors to transmit the multicast packet to the second neighbor network device, cause the one or more processors to:
transmit the multicast packet to the second neighbor network device to further cause the second neighbor network device to be provisioned with information indicating that the network device does not support BIER.

14. The non-transitory computer-readable medium of claim 8, wherein the one or more instructions, that cause the one or more processors to transmit the information indicating that the network device supports BIER, cause the one or more processors to:
transmit the information via interior gateway protocol (IGP) control plane signaling.

15. A method, comprising:
transmitting, by a network device and to a first neighbor network device, information indicating that the network device supports bit indexed explicit replication (BIER),
wherein the network device does not support BIER, and
wherein the first neighbor network device is communicatively connected to the network device;
receiving, at the network device, a multicast packet from the first neighbor network device based on transmitting the information indicating that the network device supports BIER,
wherein the multicast packet includes a first BIER label associated with the network device,
wherein the first BIER label indicates that the network device supports BIER;
replacing, by the network device, the first BIER label included in the multicast packet with a second BIER label associated with a second neighbor network device,
wherein the second neighbor network device is communicatively connected to the network device, and
wherein the second neighbor network device is a BIER-enabled network device that performs BIER functions for the network device; and
transmitting, by the network device after replacing the first BIER label included in the multicast packet with the second BIER label, the multicast packet to the second neighbor network device to cause the second neighbor network device to:
tunnel the multicast packet to a third neighbor network device that supports BIER through the network device, and
encapsulate the multicast packet in an additional encapsulation layer.

16. The method of claim 15, wherein a first connection between the network device and the second neighbor network device has greater bandwidth relative to a second connection between the network device and the first neighbor network device.

17. The method of claim 15, wherein transmitting the multicast packet to the second neighbor network device includes:
transmitting the multicast packet to the second neighbor network device to further cause the second neighbor network device to:
be provisioned with information indicating that the network device does not support BIER.

18. The method of claim 15, wherein the tunnel is a unicast tunnel.

19. The method of claim 15, wherein the tunnel is a multicast tunnel.

20. The method of claim 15, wherein transmitting the information indicating that the network device supports BIER comprises:
transmitting the information via interior gateway protocol (IGP) control plane signaling.

* * * * *